(12) United States Patent
van den Berg et al.

(10) Patent No.: US 6,823,818 B2
(45) Date of Patent: Nov. 30, 2004

(54) FEED METERING DEVICE

(75) Inventors: Karel van den Berg, BR Bleskensgraaf (NL); Howard Sie, Rotterdam (NL); Lucien Eliza Niels Voogd, HG Leerdam (NL)

(73) Assignee: Lely Enterprises A.G., Butzenweg (CH)

( * ) Notice: Subject to any disclaimer, the term of this patent is extended or adjusted under 35 U.S.C. 154(b) by 34 days.

(21) Appl. No.: 10/085,060

(22) Filed: Mar. 1, 2002

(65) Prior Publication Data

US 2002/0121244 A1 Sep. 5, 2002

(51) Int. Cl.[7] .............................................. A01K 5/02
(52) U.S. Cl. ................................ 119/51.02; 119/51.12
(58) Field of Search .......................... 119/51.02, 51.11, 119/51.12, 56.1

(56) References Cited

U.S. PATENT DOCUMENTS

| | | | | |
|---|---|---|---|---|
| 4,049,950 A | * | 9/1977 | Byrne et al. ................ 235/376 |
| 4,461,241 A | * | 7/1984 | Ostler ...................... 119/51.02 |
| 4,532,892 A | * | 8/1985 | Kuzara ..................... 119/51.02 |
| 5,140,944 A | * | 8/1992 | Jeng ........................ 119/51.11 |
| 5,778,820 A | * | 7/1998 | van der Lely et al. .... 119/14.18 |
| 6,234,111 B1 | * | 5/2001 | Ulman et al. ................. 119/54 |
| 6,349,671 B1 | * | 2/2002 | Lewis et al. .............. 119/51.02 |
| 6,367,417 B1 | * | 4/2002 | Gal et al. ................... 119/51.5 |
| 6,371,047 B1 | * | 4/2002 | van den Berg .......... 119/51.02 |

* cited by examiner

Primary Examiner—Charles T. Jordan
Assistant Examiner—Kimberly S. Smith
(74) Attorney, Agent, or Firm—Penrose Lucuas Albright

(57) ABSTRACT

A feed metering apparatus for supplying a consumable substance to a feeding trough for consumption by an animal, such as a dairy cow, while at least one further animal that has voluntary access to the same trough to consume a consumable substance therefrom is waiting for the animal at the feeding trough to depart. The feeding trough has an entrance opening which can be closed by a closing member. The apparatus intermittently supplies a quantity of a consumable substance to the feeding trough. The feeding trough has a weighing mechanism for continuously weighing the amount of the consumable substance in the feeding trough. A control mechanism is provided for closing the feeding trough's opening and there is a timing component. The control mechanism closes the opening of the feeding trough based on the combination of a lower threshold value of the amount of consumable substance remaining in the feeding trough as determined by the weighing mechanism and an upper threshold value of the duration of time since an animal at the feeding trough either stopped consuming a consumable substance therefrom or slowed its pace of doing so to a predetermined amount.

4 Claims, 2 Drawing Sheets

FEED METERING DEVICE

FIELD OF THE INVENTION

The present invention relates to a feed metering apparatus for supplying fodder of drink or both to an animal which has a feeding trough with means for closing its opening and a feed supply device for intermittently supplying a quantity of fodder or drink, or both, into the feeding trough.

Such feed metering apparatuses for, for example, cows, are generally known. A disadvantage to all these known feed metering apparatuses is that an animal quickly learns where the fodder or drink or both can be obtained, and regularly goes to the apparatus where it inserts its head into the feeding trough, even when it has already received its portion of fodder or drink or both. This disturbs the feeding of other animals. For the purpose of preventing animals that are ineligible to be fed from having access to the feeding trough, its entrance opening is closed by a closing means.

It is thus an object of the invention to provide an improved feed metering apparatus that denies ineligible animals from receiving feed or drink or both from the feeding trough of the apparatus.

SUMMARY OF THE ANIMAL

According to the invention, a feed metering apparatus of the above-described type is provided a detection device that determines the quantity of fodder or drink or both at a point of time after receiving a supply of a quantity of fodder or drink or both and issuing based on the quantity determination a signal for operating a closing means for prohibiting access to the trough. Animals that have used the feeding trough, even after there is no more fodder or drink or both present therein, may still retain their heads in the feeding trough during a short to longer period of time waiting for additional fodder or drink or both to be supplied. As a result another animal ready to be fed cannot gain access to the feeding trough immediately. According to the invention this is result is avoided by operating the closing means, after an animal has consumed at least a part of the quantity of fodder or drink, or both, provided so that further access to the feeding trough is impossible for that animal. An animal that has just made use of the feeding trough is thus encouraged to leave the feeding trough.

The detection device preferably comprises a weighing member for weighing the quantity of fodder or drink or both in the feeding trough. Said weighing member is capable of measuring whether or not there is still fodder or drink or both present in the feeding trough after a quantity of fodder or drink or both had been supplied into the feeding trough. Thus the weighing member, after having determined that there is no more fodder or drink or both present in the feeding trough, has the capacity to issue a signal for operating the closing means for closing the feeding trough.

When the detection device comprises a clock, it is possible to measure how long the quantity of fodder or drink or both in the feeding trough remains untouched. By setting for example an upper limit, after said upper limit has elapsed, that is after a certain threshold period of time has elapsed, the clock can issue a signal for the closing means to close. In particular when data from the weighing member and the clock are combined, an extremely efficient use of the feed metering apparatus is possible.

The invention also relates to a feed metering apparatus for supplying fodder or drink or both in metered portions to an animal, said feed metering apparatus being provided with a feeding trough for containing fodder or drink or both, an entrance opening to the feeding trough, a closing means for closing the entrance opening, and a feed supplying device for intermittently supplying a quantity of fodder and/or drink into the feeding trough, characterized in that the feed metering apparatus is provided with a detection device for determining the quantity of fodder or drink or both in the feeding trough at a point of time after receiving a quantity of fodder or drink, or both, and for issuing, based on the quantity determination, a first signal for operating the closing means. The feed metering apparatus is provided with a clock for determining the time duration from being a supplied a quantity of fodder or drink, or both, and for issuing, based on the determination of the time duration, a second signal for operating the closing means, the feed metering apparatus being provided with a closing means operating device for operating the closing means as a result of the first or the second signal or both signals.

In an embodiment of a feed metering apparatus according to the invention, the feed metering device is provided with a means for determining the decrease per unit of time of the quantity of fodder or drink, or both, in the feeding trough. Such a means may be used for issuing a signal for operating the closing means, but may also be used (in combination with an animal identification) for determining whether the consumption rate of a particular animal corresponds with its usual eating rate. Said consumption rate may be an indication of the health of an animal.

It is particularly advantageous when the feed metering apparatus is provided with a comparator for comparing the determined decrease per unit of time with a decrease threshold. When the determined decrease per unit of time is equal to or smaller than the decrease threshold, the comparator can issue a signal causing the closing means to close the entrance opening. For reasons of accuracy the feed metering apparatus is preferably provided with a file for containing per animal a decrease threshold.

An embodiment of a feed metering apparatus according to the invention is provided with a device for detecting jamming for the closing means. This prevents an animal from being injured during closing of the entrance opening to the feeding trough.

There is preferably provided an obstacle detector for detecting an obstacle in the entrance opening. Such an obstacle detector is preferably adapted to distinguish animals and other objects from each other.

It has appeared that animals, after having consumed the quantity of fodder or drink, or both, in a trough knock or kick with force against the feed metering apparatus in trying to obtain additional fodder or drink or both therefrom. According to the invention this undesirable behavior is prevented by providing a violence detector. When said violence detector, which may comprise, for example, a vibration detector, which detects that an animal is kicking or otherwise banging against the feed metering apparatus, said detector issues a signal for operating the closing means for closing the feeding trough.

Preferably a detector is provided in the feed metering apparatus that is suitable for issuing, after detection of a particular situation, a signal for controlling the functioning of the closing means.

Preferably the feed metering apparatus is further provided with an animal identification system for identifying a particular animal that visits the feeding trough. Such an animal identification system may be used extremely advantageously for supplying a quantity of fodder or drink, or both, by the feed supplying device to the feeding trough based on data from the animal identification system. With the aid of data from the animal identification system the operation of the closing means is controlled in an advantageous manner, so that it is possible to prohibit a particular animal access to the feeding trough. Because the animal identification system is adapted to identify a particular animal, the system is especially suitable for holding back an animal wishing to make use of the feeding trough at an undesired point of time. Moreover, the animal identification device is adapted to co-operate with the obstacle detector for obtaining an extremely efficient functioning of the closing means.

The closing means may be formed by a separate component, but is preferably part of the feeding trough itself which is designed as a movable one. As a result thereof the number of components is limited and the feed metering apparatus can be manufactured inexpensively.

A feed metering apparatus according to the invention is in particular characterized in that it is provided with a device for issuing a warning signal indicating that the closing means is going to close. In this manner an animal knows when the closing means will close, and thus it is possible to teach the animal to leave the feeding trough when the warning signal (such as a sound or light signal) is issued.

The present invention further relates to a feed metering apparatus for supplying fodder or drink, or both, to an animal having a supplying means for intermittently supplying a quantity of fodder or drink, or both, into a feeding trough, a clock for determining the duration of time said quantity has been received in the feeding trough, and based on such duration of time a signal for operating closing means of the trough. With the clock it is thus possible to measure how long the quantity of fodder or drink, or both, in the feeding trough has remained untouched. By setting for example an upper time duration limit, after said upper limit has elapsed, that is after a certain threshold period of time has elapsed, the clock can cause a signal to be issued that causes the closing means to close.

The present invention further relates to a feed metering apparatus for supplying fodder or drink or the like to an animal wherein the apparatus including violence detector as stated above. Animals, after having consumed the quantity of fodder or drink, or both, in a feed trough may knock, bang against or kick with force the feed metering apparatus in an attempt to obtain additional fodder or drink, or both. According to the invention this undesirable behavior is prevented by providing a violence detector. When the violence detector, which may comprise, for example, a vibration detector, detects that the feed metering apparatus is being banged against or kicked by an animal, the detector issues a signal for operating the closing means for closing the feeding trough.

The present invention further relates to a feed metering apparatus for supplying fodder or drink, or both, to an animal which includes means for detecting that a closing member for an entrance opening to a feeding trough is jammed. This prevents an animal from being injured during closing of the entrance opening to the feeding trough.

The present invention further relates to a feed metering apparatus for supplying fodder or drink, or both, to an animal which includes an obstacle detector for detecting obstacles in the entrance opening of a feeding trough. Such an obstacle detector is preferably suitable for distinguishing animals and other objects from each other.

The invention also relates to a feed metering apparatus for supplying fodder or drink, or both, in metered portions to an animal, said feed metering apparatus being provided with a feeding trough for containing fodder or drink, or both, an entrance opening to the feeding trough, a closing means for closing the entrance opening, and a feed supplying device for intermittently supplying a quantity of fodder or drink, or both, into the feeding trough, characterized in that the feed metering apparatus is provided with a device for issuing a warning signal indicating that the closing means is going to close. In this manner an anima knows when the closing means will close.

The invention further relates to a method of supplying fodder or drink, or both, in metered portions to an animal, which method comprises the step of supplying a quantity of fodder or drink, or both, into a feeding trough of a feed metering apparatus, and the step of closing an entrance opening to the feeding trough by a closing means, characterized in that the method comprises the step of determining the quantity of fodder or drink, or both, in the feeding trough at a point of time after quantity of fodder or drink, or both, to be supplied to the feeding trough is known whereupon the entrance opening closed based on such known quantity of fodder or drink or both. In this manner an extremely efficient use f the feed metering apparatus is possible.

In an embodiment of a method according to the invention the method comprises the step of intermittently measuring the quantity of fodder or drink, or both, in the feeding trough. Although a single determination of the quantity of fodder or drink, or both, present at a certain point of time after the supply of a determined quantity suffices for having the entrance opening closed, it is more accurate to perform a plurality of quantity determinations, i.e. to make quantity determinations intermittently. In this manner incorrect values, such as may occur when the animal pushes on the feeding trough with its snout and thus disturbs the quantity determination, can be corrected. A particularly accurate closing and consequently an extremely efficient use of the feed metering apparatus is obtained when the method comprises the step of continuously measuring the quantity of fodder or drink, or both, in the feeding trough.

It is particularly advantageous when the method comprises the step of determining the decrease per unit of time of the quantity of fodder or drink, or both, in the feeding trough. For that purpose successive quantity determinations are compared with each other. When the method comprises the step of comparing the decrease per unit of time with a decrease threshold, it is possible to make an accurate decision regarding closing of the entrance opening. It is particularly advantageous when the method comprises the step of having the entrance opening closed when the decrease per unit of time is equal to or smaller than the decrease threshold. A reliable closing can be obtained when the method comprises the step of causing the entrance opening to be closed when the decrease per unit of time during a pre-adjustable period is equal to or smaller than the decrease threshold. Alternatively it is also possible to take the number of times when the decrease per unit of time is below the decrease threshold as a closing criterion.

Different animals having different eating rates, the method preferably comprises the step of identifying the animal, the step of determining for each animal an individual decrease threshold, and the step of comparing the decrease per unit of time with the individual decrease threshold.

BRIEF DESCRIPTION OF THE DRAWINGS

The invention will be hereinafter by way of example with reference to the drawings, in which.

DETAILED DESCRIPTION OF THE PREFERRED EMBODIMENTS OF THE INVENTION

Figure 1:
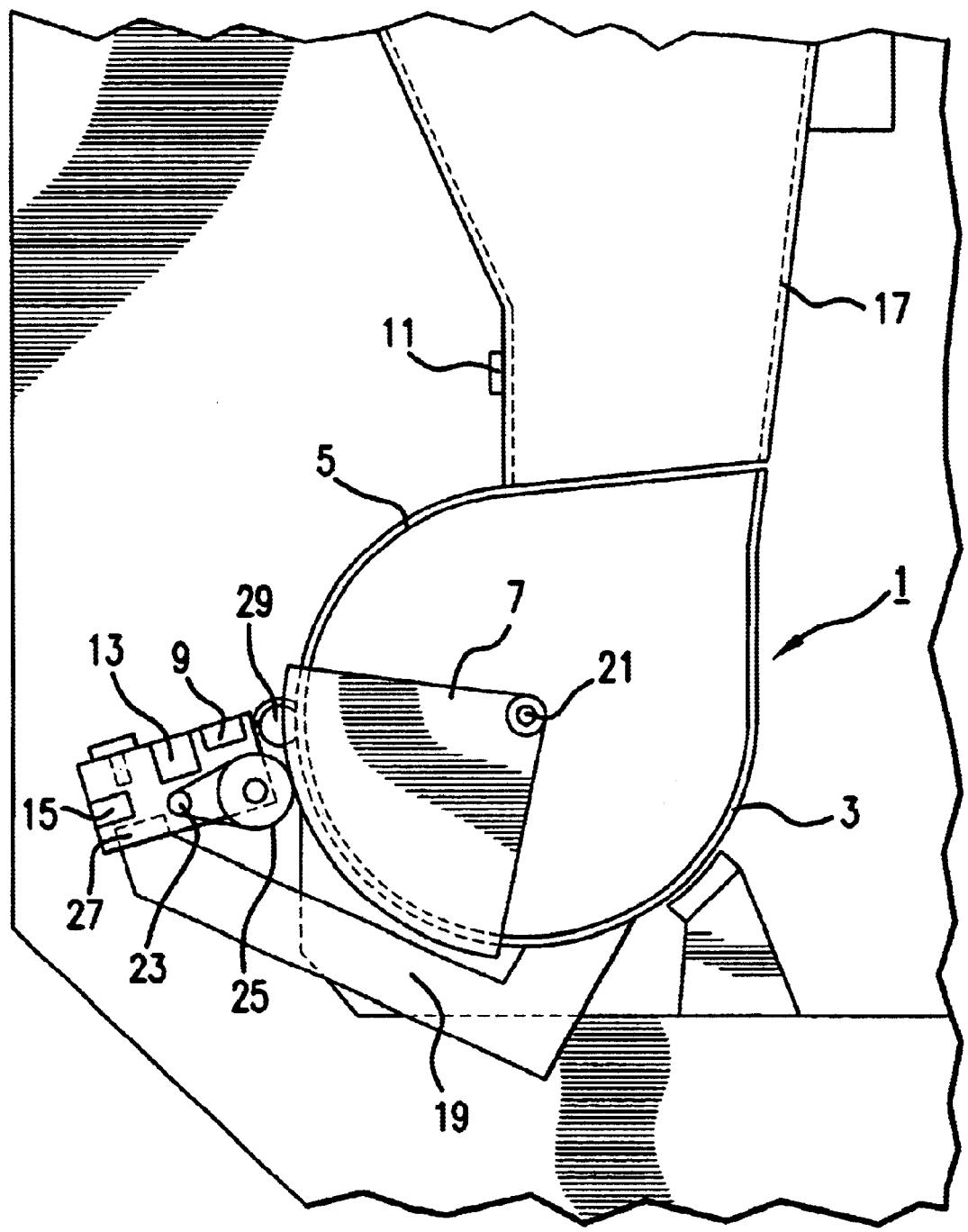
FIG. 1 shows an embodiment of a feed metering device according to the invention.

FIG. 1 shows schematically an embodiment of a feed metering apparatus 1 according to the invention. Feed metering apparatus 1 supplies fodder or drink, or both, (hereinafter designated as "feed", by which is meant "fodder or drink or both") in metered portions to an animal, and is provided with a feeding trough 3 for containing feed. An entrance opening 5 makes feeding trough 3 accessible to an animal, for example, but not exclusively, a cow. An animal identification device 15 which is well known in the art is preferably disposed in feed metering apparatus 1 and identifies a particular animal approaching feeding trough 3 and wishing to make use of it. A feed supplying device 17 supplies a quantity of feed into feeding trough 3, possibly with the aid of data from animal identification device 15, feed from a feed stock arriving in feeding trough 3 via a chute.

Thus it is possible for feed metering apparatus 1 to identify a particular animal, such as a cow, for example by means of a transponder fitted to or on the cow. Feed supplying device 17 is controlled in a known manner by software ensuring that the right amount of feed is supplied to the relevant cow.

Feed metering device 1 is provided with a closing means 7 that is movable across entrance opening 5 of feeding trough 3. When closing means 7 is moved across entrance opening 5, feeding trough 3 is made inaccessible to a particular animal, after which, as it has observed in practice, the animal leaves the entrance of its own will, thus making to feeding trough 3 available to a next animal. In the embodiment shown closing means 7 is constituted by a vessel-like element which is capable of rotating about an axis 21. Said axis 21 may be functionally constituted by an axle which is driven by a motor, which motor, as will be described hereinafter, is controlled with the aid of data in relation to the quantity of feed present in the feeding trough.

Figure 2:
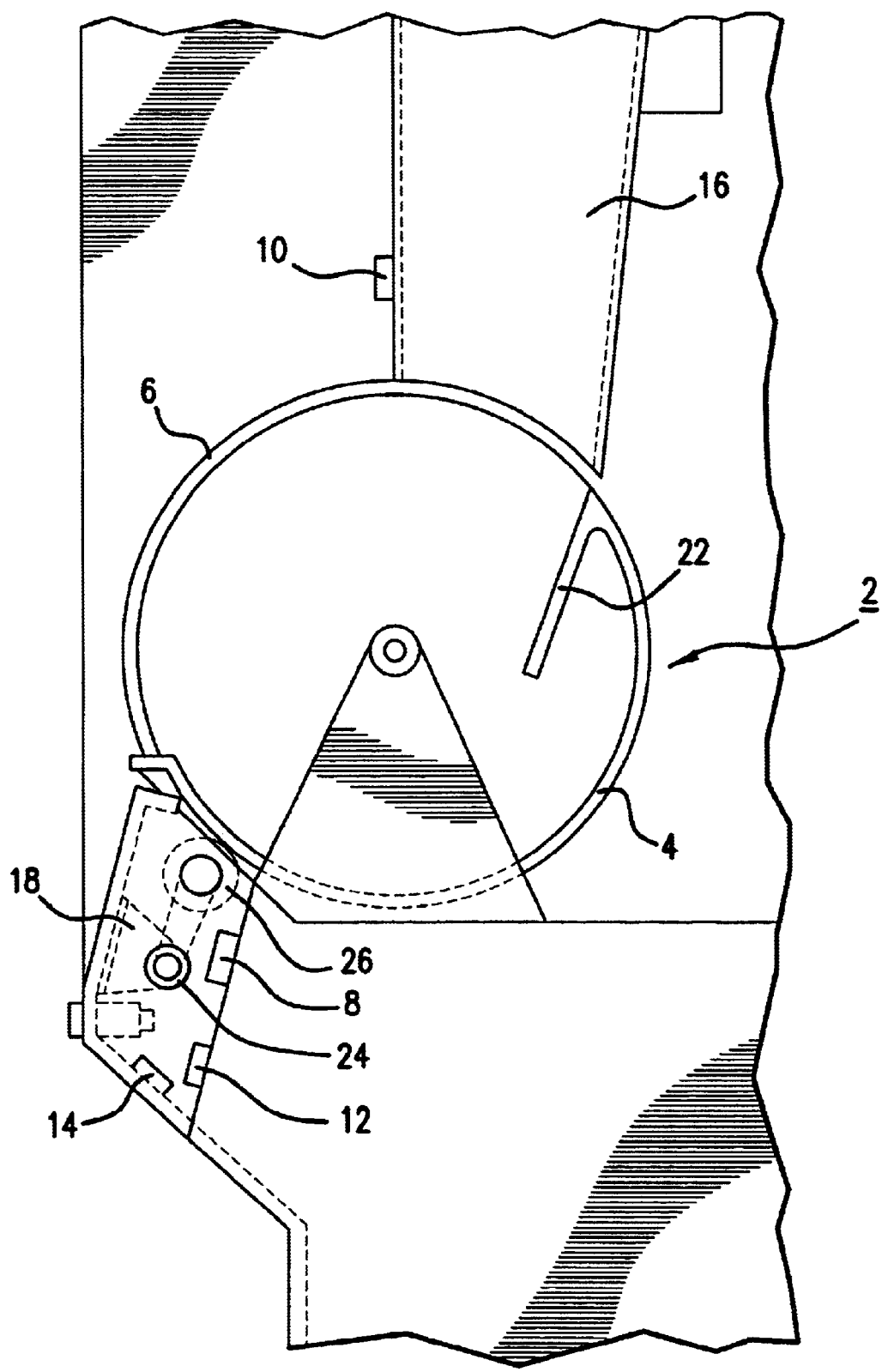
FIG. 2 shows an alternative embodiment of a feed metering device according to the invention.

FIG. 2 shows schematically an alternative embodiment of a feed metering apparatus 2 according to the invention. In this embodiment the closing means is constituted by the feeding trough 4 itself which is designed as a movable one. As shown in FIG. 2, feeding trough 4 is rotatably disposed about an axis 20, which axis 20 may be functionally constituted by an axle which is driven by a motor, said motor being controlled with the aid of data in relation to the quantity of feed present in the feeding trough, as will be explained hereinafter. In order to prevent feed from falling from feeding trough 4 in the position in which feeding trough 4 closes the entrance opening 6, feeding trough 4 is provided with a wall portion 22 for catching remaining feed. Said wall portion 22 can also act as a feed guide means for feed supplied by the feed supplying device 16 into feeding trough 4.

In the embodiment described, the closing means rotates about an axis, the closing means being driven by a motor controlled with the aid of data in relation to the quantity of feed present in the feeding trough. For the purpose of providing a simple and reliable construction with a compact construction, rolls 25 and 26 are driven by corresponding motors 23 and 24, which rolls, 25 and 26, contact corresponding closing means 7 and 4. According to the invention feed metering apparatuses 1 and 2 are provided with respective detection devices 19 and 18 for detecting after a quantity of feed has been supplied to the corresponding feed troughs 3 and 4 that at least a part of the relevant quantity of feed has been removed from feeding troughs 3 and 4, and for issuing on such basis a signal for operating respective closing means 7 and 4. Thus it is possible to prevent that, after an animal has consumed at least a part of the relevant quantity of feed, the animal remains at the corresponding feeding trough 3 or 4, by operating closing means 7 or 4 after receipt of a signal from a corresponding detection device 19 or 18. An animal which has just made use of the feeding trough is then encouraged to leave the entrance to that feeding trough. Such a detection device may for example be constituted by a camera which, by means of image recognition software, provides an estimation of the quantity of feed present in the feeding trough.

However, the detection device is preferably constituted by a weighing device for weighing the feed present in the feeding trough. Such weighing devices are known. With the aid of them it is possible to determine how much feed has been consumed by a particular animal, and also whether there is remaining feed present in the feeding trough. The relevant closing means 7 or 4 is then preferably controlled with the aid of data both from the animal identification device and from the weighing device, so that the eating behavior of a particular animal can be taken into account. The weighing device is capable of measuring whether or not there is still feed present in the feeding trough and, if so, how much feed is remaining. Thus the weighing device can, for example, after having detected that there is no more feed present in the feeding trough, issue a signal for operating the closing means for closing the feeding trough.

As shown in FIG. 1, the weighing device is constituted by a device 19 for determining the degree of feeding trough 3 has pivoted, and for deducing therefrom the weight of the feed present in feeding trough 3. In this situation, in the example shown, feeding trough 3 bears on a load sensor 27 via a supporting arm 19, feeding trough 3 pivoting about a hinge pin 29.

In the embodiment of FIG. 2 the weighing device for weighing the feed present in the feeding trough comprises the movable feeding trough 4. The feeding trough 4 is moved in a circular reciprocating manner by motor 24 by which roll 26 is driven. This movement generates a torque, the magnitude of which is determined by a device 18 for measuring the magnitude of the torque. From the torque so determined, device 18 deduces the weight of the feed present in the feeding trough. The exact correlation between torque and quantity of feed can previously be determined by means of simple calibration tests.

Detection devices 19 and 18 preferably comprise clocks, so that it is possible to assure how long a quantity of feed remains in the relevant feeding troughs 3 and 4. By setting for example an upper time limit, after said upper limit has elapsed, that is after a certain threshold period of time ahs elapsed, the clock involved can issue a signal which results in closing means 7 or 4 being closed. In particular when data from the weighing device and the clock are combined, an extremely efficient use of the feed metering device is possible. This makes it possible for example to use for each animal a combination of data in relation to a lower threshold for remaining feed and an upper threshold for the time for operating the relevant closing means 7 or 4. Thus, when during a longer time than the threshold time less than the lower threshold of feed is present in the corresponding feeding trough 3 or 4, the closing means is operated. As a non-limiting example, approximately 2% to 10% of the quantity of feed supplied by the feed supplying apparatus to the feeding trough as a threshold for the quantity of remaining feed, and approximately ten to sixty seconds as a threshold time.

The invention also relates to a method of supplying feed in metered portions to an animal, which method comprises the step of supplying a quantity of feed into a feeding trough of a feed metering apparatus, and the step of having an entrance opening to the feeding trough closed by a closing means, characterized in that the method comprises the step of determined the quantity of feed in the feeding trough at a point of time after the supply of such supplied quantity of feed to the feeding trough, and the step of having the entrance opening then closed based on the determined quantity of remaining feed. In this manner an extremely efficient use of the feed metering apparatus is possible.

In an embodiment of a method according to the invention, the method comprises the step of intermittently measuring the quantity of feed in the feeding trough. Although a single determination of the quantity of feed present at a certain point of time after the initial supply of a quantity of feeding to the feeding trough suffices for having the entrance opening closed, it is more accurate to use a plurality of quantity determinations, that is to make the quantity determination intermittently. In this manner incorrect values owing, for example, to the fact that the animal pushes on the feeding trough with its snout and thus disturbs the quantity determination, can be corrected. A particularly accurate closing and consequently an extremely efficient use of the feed metering apparatus is obtains when the method comprises the step of continuously measuring the quantity of feed in the feeding trough.

It is particularly advantageous when the method comprises the step of determining the decrease per unit of time of the quantity of feed in the feeding trough. For that purpose successive quantity determinations are compared with each other. When the method comprises the step of comparing the decrease per unit of time with a decrease threshold, it is possible to make an accurate decision regarding closing of the entrance opening. It is particularly advantageous when the method comprises the step of having the entrance opening closed when the decrease per unit of time is equal to or smaller than the decrease threshold. An advantageous closing may occur when the method comprises the step of having the entrance opening closed when the decrease per unit of time during a pre-adjustable period is equal to or smaller than the decrease threshold. Alternatively it is also possible to take the number of times the decrease per unit of time falls below the decrease threshold as a closing criterion.

Different animals having different eating rates, the method preferably comprises the step of identifying the animal by means of an animal identification device such as devices 14 and 15, the step of determining for each animal an individual decrease threshold, and the step of comparing the decrease per unit of time with the individual decrease threshold.

The embodiments of a feed metering apparatus shown in FIGS. 1 and 2 are provided with respective devices 9 and 8 for detecting jamming of corresponding closing means 7 and 4. This prevents an animal from being injured during closing of the entrance opening to the feeding trough. Devices for detecting jamming are known. For example they are provided for automatically closing automobile windows. When the device for detecting jamming detects a jamming, said device ensures by controlling the closing means that the latter discontinues its function of closing the entrance opening. Preferably the closing means therefore automatically attempts again to close the entrance opening after a short time, such as less than two seconds. In a similar manner, when an animal does not clear the entrance to the feeding trough after the first closing attempt by the closing means, the closing means will repeat the closing action several times until it has completely closed the entrance opening. When the closing means continues to open and close, there may be a defect. Consequently it is advisable to attempt to close the entrance opening a maximum number of times, with an alarm signal being transmitted after said maximum number has been reached. Said alarm signal may be audible, visible or otherwise.

Obstacle detectors 11 and 10 are provided for detecting obstacles in the entrance openings. Such obstacle detectors 11 and 10 are preferably suitable for distinguishing animals and other objects from each other. For that purpose a combination with the animal identification device is advantageous, although image recognition equipment is possible as well. An obstacle could for example be constituted by the hand of a person cleaning the feeding trough, it then being appreciated that the closing means must not be closed while the hand is located in the entrance opening.

The embodiments of the invention according to FIGS. 1 and 2 also comprise a violence detectors 13 and 12 for detecting undesired kicking, banging, knocking or the like against feed metering apparatus 1 and 2. When violence detectors 13 and 12, which may comprise, for example, vibration detectors, detect that feed metering apparatuses 1 and 2 are being banged, knocked or kicked, then said detectors issue a signal for operating closing means 7 and 4 for closing the feeding troughs 3 and 4, as appropriate.

Preferably a warning signal is provided which warns of the closing of the closing means so that the animals are warned of closing.

Although we have disclosed the preferred embodiments of our invention, it is to be understood that it is capable of other adaptations and modifications within the scope of the following claims:

What is claimed is:

1. A feed metering apparatus for supplying a consumable substance to a feeding trough for consumption thereof by an animal while at least one other animal is provided with voluntary access to consume a consumable substance from the same feeding trough after said first mentioned animal departs therefrom, the apparatus comprising said feeding trough, an entrance opening to said feeding trough, a closing means for closing said entrance opening, supplying means for intermittently supplying a quantity of a consumable substance to said feeding trough, detection means for detecting the amount of said consumable substance in said feeding trough, and control means for closing said entrance opening based on a combination of a lower threshold value of the amount of said consumable substance remaining in said feeding trough when the animal at said feeding trough is no longer consuming said consumable substance therefrom and an upper threshold value measured in time during which said animal at said feeding trough is no longer consuming said consumable substance from said feeding trough, whereby said entrance opening is closed by said control means based on said combination of said lower threshold value and said upper threshold value.

2. A feed metering apparatus in accordance with claim 1, wherein said detection means comprises a weighing device for weighing the quantity of said consumable substance in said feeding trough.

3. A feed metering and apparatus in accordance with claim 1, which comprises a clock which measures the duration of time of said upper threshold value.

4. A feed metering apparatus for supplying a consumable substance to a feeding trough for consumption thereof by an animal while at least one other animal is provided voluntary access to consume a consumable substance from the same feeding trough after said first mentioned animal departs therefrom, the apparatus comprising said feeding trough, an entrance opening to said feeding trough, a closing means for closing said entrance opening, supplying means for intermittently supplying a quantity of a consumable substance to said feeding trough, detection means for detecting the amount of said consumable substance in said feeding trough and the rate that said consumable substance is being consumed by said animal at said feeding trough, and control means for closing said entrance opening based on a combination of a lower threshold value of said rate that said consumable substance is being consumed by said animal at said feeding trough and an upper threshold value measured by the time during which said animal at said feeding trough is consuming said consumable substance therein at a predetermined slow rate, whereby said control means closes said entrance opening based on a combination of said lower threshold value and said upper threshold.

* * * * *